United States Patent [19]
Katsuki et al.

[11] Patent Number: 5,166,739
[45] Date of Patent: Nov. 24, 1992

[54] SHEET DISCHARGING DEVICE FOR IMAGE FORMING EQUIPMENT

[75] Inventors: Masanori Katsuki, Yokohama; Misao Tanzawa, Kawasaki; Tsuyoshi Yoshimura, Tokyo; Takeshi Iijima, Yokohama, all of Japan

[73] Assignee: Ricoh Company, Ltd., Tokyo, Japan

[21] Appl. No.: 755,578

[22] Filed: Sep. 5, 1991

[30] Foreign Application Priority Data

Sep. 5, 1990 [JP] Japan .................... 2-234957
Dec. 13, 1990 [JP] Japan .................... 2-410463

[51] Int. Cl.⁵ .................................... G03G 15/00
[52] U.S. Cl. .................................... 355/319; 355/24; 355/309; 346/153.1
[58] Field of Search .............. 355/309, 318, 319, 23, 355/24; 346/160, 153.1; 358/401

[56] References Cited

U.S. PATENT DOCUMENTS

| | | | |
|---|---|---|---|
| 4,437,756 | 3/1984 | Kawakubo et al. | 355/24 X |
| 4,607,942 | 8/1986 | Koyama et al. | |
| 4,928,150 | 5/1990 | Hatta | 355/311 |
| 4,967,240 | 10/1990 | Kitano et al. | 355/318 |

Primary Examiner—Richard L. Moses
Attorney, Agent, or Firm—Oblon, Spivak, McClelland, Maier & Neustadt

[57] ABSTRACT

A sheet discharging device incorporated in digital image forming equipment which is selectively operable in a copier mode, facsimile mode, and printer mode. The sheet discharging device has a plurality of sheet outlets each being positioned at a particular level matching respective one of the modes.

7 Claims, 12 Drawing Sheets

SHEET DISCHARGING DEVICE FOR IMAGE FORMING EQUIPMENT

BACKGROUND OF THE INVENTION

The present invention relates to digital image forming equipment capable of selectively operable as a digital copier, facsimile transceiver and printer and, more particularly, to a sheet discharging device for such equipment which discharges a sheet carrying an optical image thereon to the outside of the equipment.

Complex image forming equipment having multiple functions as stated above is extensively used today. A digital copier, for example, is operable not only in a copier image input mode but also in a facsimile image input mode and a printer image input mode, as desired. This type of copier transmits or receives data to or from a remote station over a subscriber line or prints out data sent from a host computer on a sheet in a printer mode. The image formed in any one of such modes is transferred to and fixed on a sheet. The sheet carrying the image thereon is driven out of the copier to a tray or a sorter or similar finisher which is selectively mounted on the copier, the sorter having multiple bins therein. It follows that the sheets or copies produced by a particular mode have to be discharged in an optimal fashion matching the characteristics of the mode. For example, if the sheets undergone the different mode operations are driven out to a single tray, they will be mixed together and dealt with incorrectly in the finishing stage. Sheets carrying images produced in the printer mode or the facsimile mode are usually discharged face up from the first page to the last page and, therefore, have to be rearranged in order of page after the discharge. Hence, this kind of sheets should preferably be discharged face down, the first page being first. A sheet discharging device incorporated in a conventional image forming equipment operable only in a copier mode, i.e., an ordinary copier, has a function of turning over sheets undergone simple copier mode operations before driving them out from the copier, as needed. This kind of device, however, cannot implement an optimal discharge procedure matching a particular mode when applied to complex image forming equipment which is operable in various modes.

SUMMARY OF THE INVENTION

It is, therefore, an object of the present invention to provide a sheet discharging device incorporated in complex digital image forming equipment of the type described for discharging sheets carrying images produced in a particular mode in an optimal fashion matching the mode.

It is another object of the present invention to provide a generally improved sheet discharging device for complex image forming equipment.

In accordance with the present invention, a sheet discharging device for digital image forming equipment which forms an image in any one of a plurality of modes each having a particular image data input route and records it on a sheet comprises a plurality of outlets for discharging a sheet to the outside of the image forming equipment, a plurality of transport paths for transporting the sheet to the outlets, and a plurality of selecting means each for selecting particular one of the transport paths to discharge the sheet via particular one of the outlets.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to image forming equipment in the form of a digital copier to which the present invention is applicable.

Figure 1:
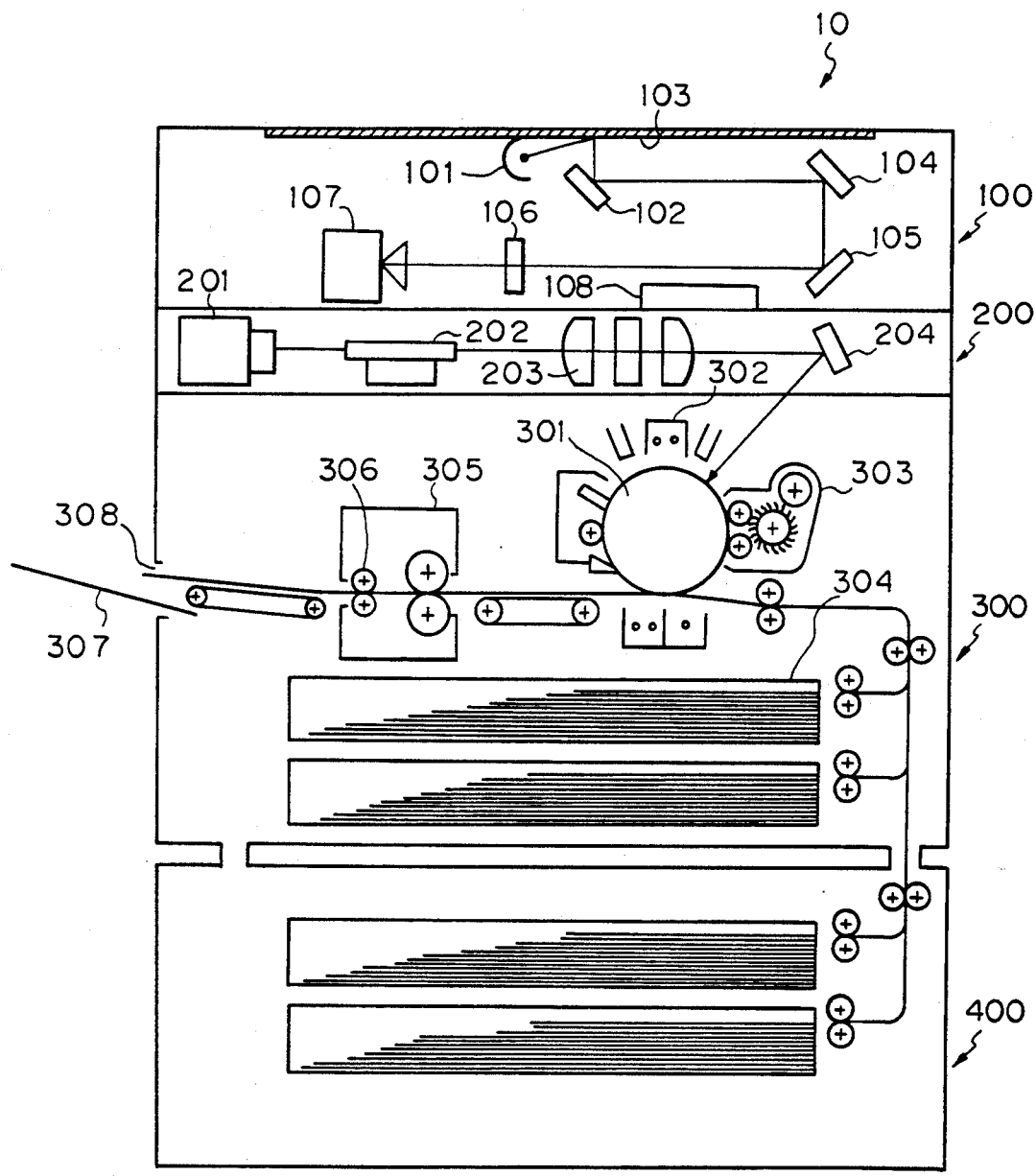
FIG. 1 is a section showing a conventional complex digital copier.

As shown in FIG. 1, a digital copier, generally 10, is generally made up of an image reading section 100, an optical image writing section 200, an image recording section 300, and a mass sheet feeding section or two-side copying unit 400. In the image reading section 100, a lamp 101 and a mirror 102 constituting a first scanner scan a document 103 by light. The resulting reflection from the document is focused onto a CCD (Charge Coupled Device) array 107 via mirrors 104 and 105 and a lens 106. The mirror 104 constitutes a second scanner which is interlocked with the first scanner. The CCD array 107 is built in an image reading board. The output of the CCD array 107, i.e., an electric signal representative of the document image is converted to a digital signal by an analog-to-digital (AD) converter which is also built in the image reading board. An image processor 108 executes necessary image processing with the digital signal from the AD converter. The optical writing section 200 is driven by the image data fed thereto from the image processor 108. Specifically, a laser diode 201 emits a beam in response to the image data. The beam from the laser diode 201 is steered in a subscanning direction by a polygonal mirror 202 which is rotating at high speed. The beam from the polygonal mirror 202 is focused onto a photoconductive element 301, which is included in the image recording section 300, by an f-theta lens 203 and a mirror 204. Conventional electrophotographic process units are sequentially arranged around the photoconductive element 301. A main charger 302, which is one of such process units, uniformly charges the peripheral surface of the photoconductive element 301. As a result, the laser beam electrostatically forms a latent image on the photoconductive element 301. The latent image is developed by a developing unit 303 and then transferred to a sheet which is fed from the sheet feeding unit 304 at a predetermined timing. The image transferred to the sheet is developed thereon by a fixing unit 305. Finally, the sheet with the fixed image is driven out of the copier to a tray 307 by a discharge roller pair 306 via an outlet 308.

The reading section 100, writing section 200 and recording section 300 are connected together by electric signals. The recording section 300 plays the role of a printer for printing out data sent from a host computer, not shown, on a sheet. In addition, the recording section 300 serves as a facsimile transceiver for transmitting and receiving data from a remote facsimile transceiver. To transmit data to a remote facsimile transceiver, an electric signal produced by the CCD 107 and representative of a document image is subjected to data compression by an interface assigned to facsimile. Further, a modem transforms the compressed electric signal to an electric signal which is adequate to be sent out to a subscriber line. Then, the resulting signal is sent over the subscriber line to another facsimile transceiver via an NCU. On the other hand, a compressed electric signal sent from a remote facsimile transceiver to the digital copier or facsimile transceiver 10 is expanded by the facsimile interface to reproduce an original electric signal. The laser diode 201 is modulated by the reproduced electric signal with the result that a latent image is electrostatically formed on the photoconductive element 301. This is followed by the previously stated developing, image transferring, fixing and sheet discharging procedure.

Figure 2:
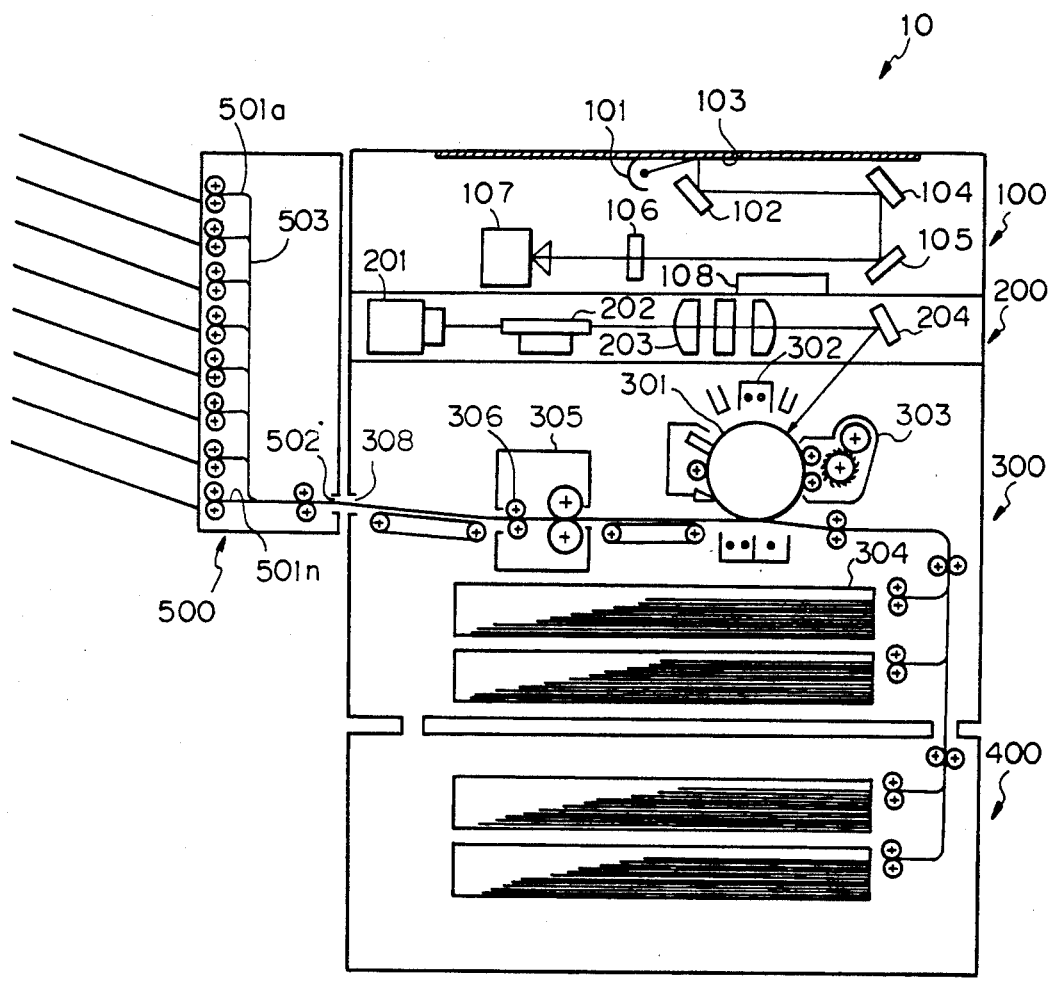
FIG. 2 is a section showing the copier of FIG. 1 on which a sorter is mounted.

Today, it is a common practice to mount a sorter or similar finisher on a copier to enhance efficient finishing of sheets having been driven out of the copier. Specifically, as shown in FIG. 2, a sorter 500 having multiple bins 501a-501n may be mounted on that side of the copier 10 where the outlet 308 is located, in which case the tray 307 is removed. The sorter 500 has an inlet 502 communicating to the outlet 308 of the copier 10 at the lowest level thereof. A sheet transport path 503 extends vertically within the sorter 500. When the copier 10 with the sorter 500 is operated in a mode other than a sort mode, the uppermost bin 501a is used as a tray for stacking sheets which will be sequentially driven out of the copier 10. Should such sheets be stacked on the lowermost bin 501n, it would be troublesome for the operator to take them out. In this manner, the sheet discharge position differs from the case wherein the sorter 500 is mounted on the copier 10 to the case where the former is not mounted on the latter.

Figure 3:
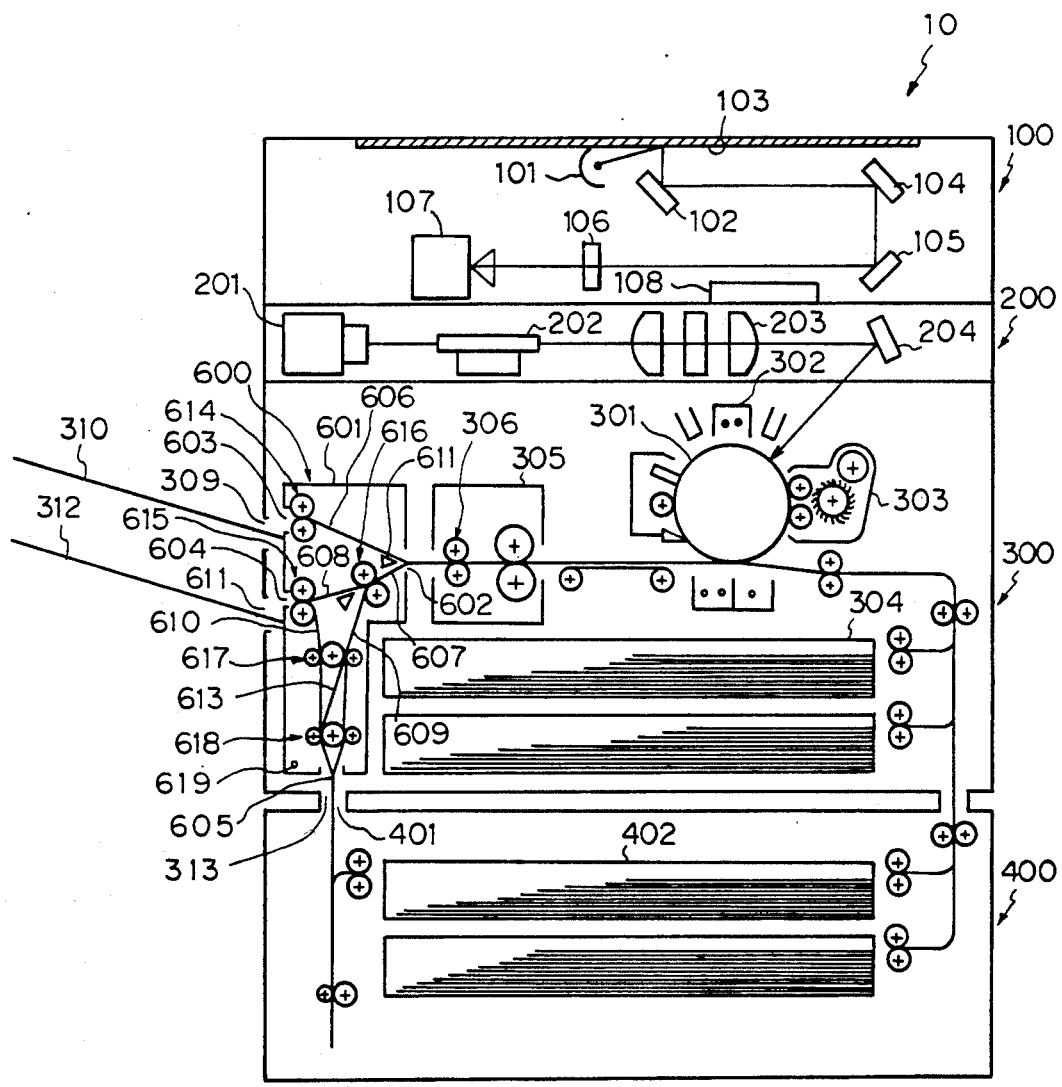
FIG. 3 is a section showing the copier of FIG. 1 in which a sheet discharging device embodying the present invention is incorporated.
Figure 4:
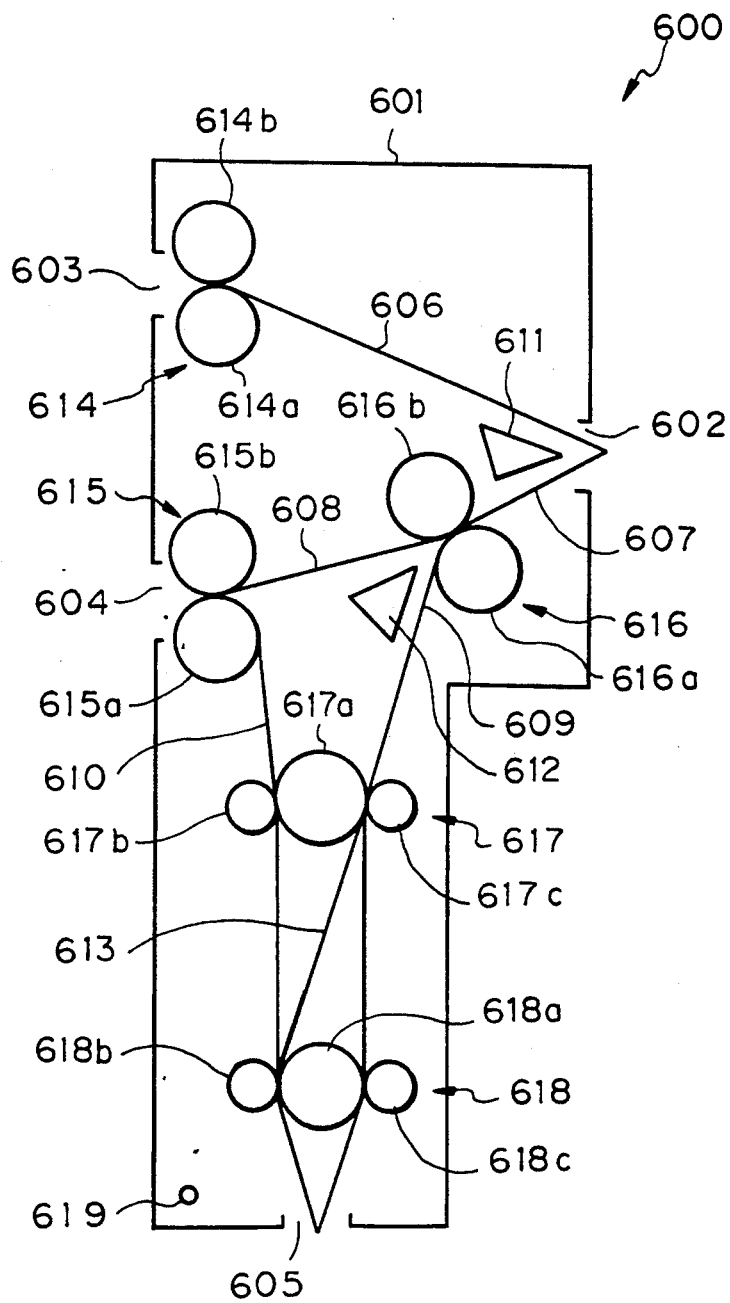
FIG. 4 is a section showing a specific construction of the device of the present invention.

Referring to FIGS. 3 and 4, the sheet discharging device of the present invention which is applied to the digital copier 10 is shown and generally designated by the reference numeral 600. As shown, the sheet discharging device 600 is disposed in the image recording section 300 of the copier 10 in the vicinity of the fixing unit 306. The device 600 has a casing 601 which is formed with an inlet 602 for admitting a sheet being driven out by the discharge roller pair 306, and a first outlet 603, a second outlet 604 and a third outlet 605 each for discharging a sheet introduced into the device 600 to the outside. The recording section 300, therefore, has a first outlet 309 and a first tray 310 associated with the first outlet 603, a second outlet 311 and a second tray 312 associated with the second outlet 604, and a third outlet 313 associated with the third outlet 605. Defined in the casing 601 of the device 600 are a first to a fifth transport path 606–610. A first path selector in the form of a pawl 611 is located at the position where the paths 606 and 607 branch off each other, while a second path selector 612 is situated at the position where the paths 608 and 609 branch off each other.

Likewise, a third path selector 613 is located at the position where the paths 609 and 610 branch off from each other. Roller pairs 614 and 615 adjoin the first and second outlets 603 and 604, respectively. The roller pair 614 has a drive roller 614a and a driven roller 614b while the roller pair 605 has a drive roller 615a and a driven roller 615b. A roller pair 616 having a drive roller 616a and a driven roller 616b is located at the position where the paths 608 and 609 branch off from each other. Roller devices 617 and 618 are arranged on the paths 609 and 610. The roller devices 617 and 618 have respectively a drive roller 617a and two driven rollers 617b and 617c and a drive roller 618a and two driven rollers 618b and 618c. The casing 601 is accommodated in the recording section 300 of the copier 10 in such a manner as to be rotatable about a fulcrum 619.

Figure 5:
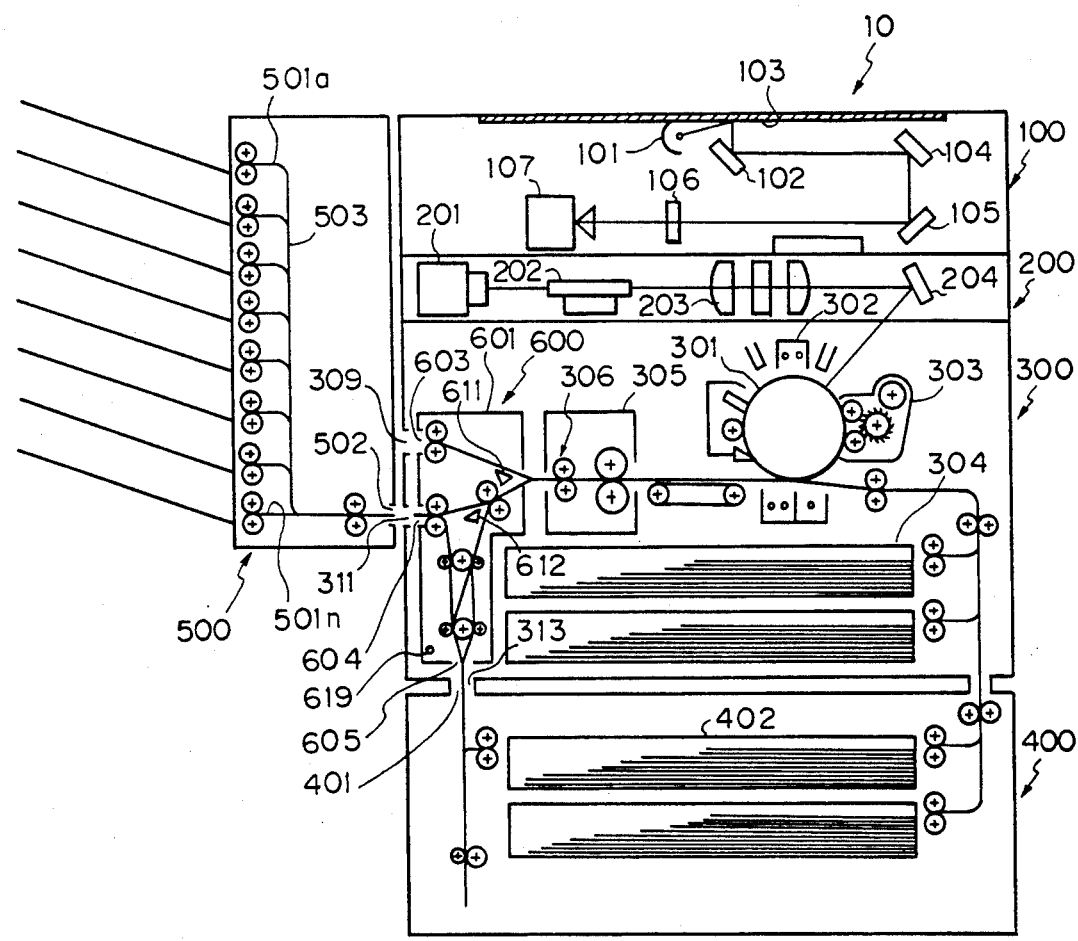
FIG. 5 is a section showing the copier of FIG. 3 with a sorter.

FIG. 5 shows the digital copier 10 having the above configuration and on which the sorter 500 is mounted in place of the trays 310 and 312. As shown, the inlet 502 of the sorter 500 faces the aligned outlets 311 and 610.

The operation of the sheet discharging device will be described hereinafter. To begin with, the positions where the copier 10 discharges sheets when operated in various modes including a facsimile mode and a copier mode will be explained.

Assume that the copier 10 is operated in a facsimile mode. In this mode operation, the path selectors 611 and 612 select the transport paths 607 and 608, respectively. As a result, a sheet on which received data has been printed out is sequentially routed through the aligned outlets 604 and 311 to the second tray 312. On the other hand, during a copier mode operation, the path selector 611 selects the transport path 611 to discharge the sheet to the first tray 310 via the transport paths 603 and 309. In this manner, the sheet discharging device 600 discharges sheets to one of the trays 310 and 312 in a facsimile mode and discharges them to the other tray in a copier mode. Therefore, even when the copier 10 is operated continuously in the two different modes, sheets driven thereoutof are preventing from being mixed together.

Assume that the copier 10 is operated in a copier mode with the sorter 500 mounted thereon, as shown in FIG. 5. Then, the sheet discharging device 600 selects the transport paths 607 and 608 to distribute sheets to any of the bins 501a-501n via the inlet 502 of the sorter 500. When the sorting operation is not needed, sheets from the copier 10 are sequentially stacked on the uppermost bin 501a. Hence, the operator can take out the sheets from the bin 501a as easily as when taking out sheets from the first tray 310 which is usually disposed above the second tray 312. Of course, to further promote the ease of such an operation, the uppermost bin 501a may be located at substantially the same level as the tray 310 by changing the position of the sorter 500 on the copier 10 or by mounting a sorter of different size on the copier 10. Assume that the copier 10 is operated in a facsimile mode with the sorter 500. Then, the path selector 612 selects the transport path 609 to discharge sheets to the outside via the outlets 605 and 313. In this case, the sheets are stacked on another tray, not shown, which is independent of the mass sheet feeding section 400. Thus, the sheet discharge position is different from a copier mode to a facsimile mode.

When the sorter 500 is mounted on the copier 10, it blocks the aligned outlets 603 and 309 located above the inlet 502 thereof with the result that the function of the transport path 606 adjoining the outlets 603 and 309 is lost. In this condition, should sheets be steered to the transport path 606, they would cause a paper jam or similar trouble to occur. In light of this, the path selector 611 is so positioned as to select the transport path 607 in place of the path 606. Specifically, when the sorter 500 is mounted on the copier 10, the present invention causes a controller, not shown, to automatically inhibit the switching function of the path selector 611 (which is constantly biased to select the transport path 607), thereby preventing it from selecting the transport path 606. Stated another way, the path selector 611 is fixed in a position for selecting the path 607. This is successful in eliminating a paper jam and other troubles which would otherwise be caused by sheets steered to the path 606. Of course, such an automatic inhibition by the controller is replaced with the user's manual operation for the purpose of reducing the cost. Further, to omit a special controller, an arrangement may be made such that when the sorter 500 is mounted, the switching function of the path selector 611 is automatically and mechanically cancelled by the sorter 500. Then, not only the manipulability is enhanced, but also the operator is prevented from forgetting to switch over the function.

A more specific construction and operation of the sheet discharging device 600 will be described.

Figure 6:
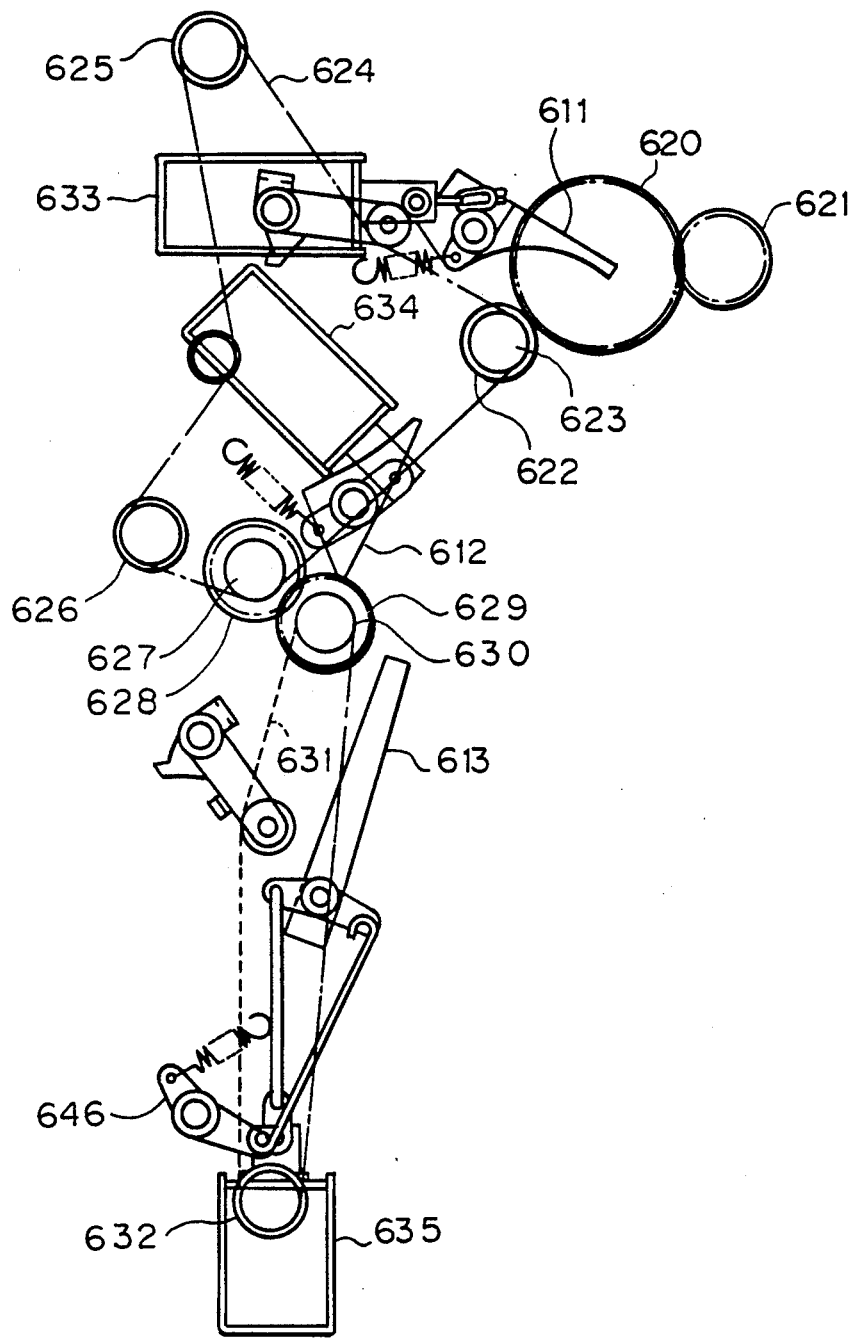
FIG. 6 shows a driveline included in the device shown in FIG. 4.

FIG. 6 shows a driveline included in the device 600 while FIGS. 7-12 each shows the device 600 in a particular operating condition. As shown in FIG. 6, an idler 620 meshes with a gear 621 which is mounted on the same shaft as the discharge roller pair 306 of the fixing unit 305. In this configuration, a driving force is transmitted to a gear 622 which is mounted on the same shaft as the drive roller 616a, FIG. 7. The rotation of the drive roller 616a is in turn transmitted to a timing belt 624 by a pulley 623 which is mounted on the same shaft as the drive roller 616a. As a result, a pulley 625, FIG. 7, mounted on the same shaft as the drive roller 614a and a pulley 626, FIG. 7, mounted on the same shaft as the drive roller 615a are rotated. Further, a gear 628 provided integrally with a pulley 627 drives a gear 629 which is mounted on the same shaft as the drive roller 617a, FIG. 7, while a pulley 630 provided integrally with the gear 629 drives a pulley 632 mounted on the same shaft as the drive roller 618, FIG. 7, via a timing belt 631. Hence, the various rollers are each rotated in a particular direction, as indicated by an arrow in the figures.

Figure 7:
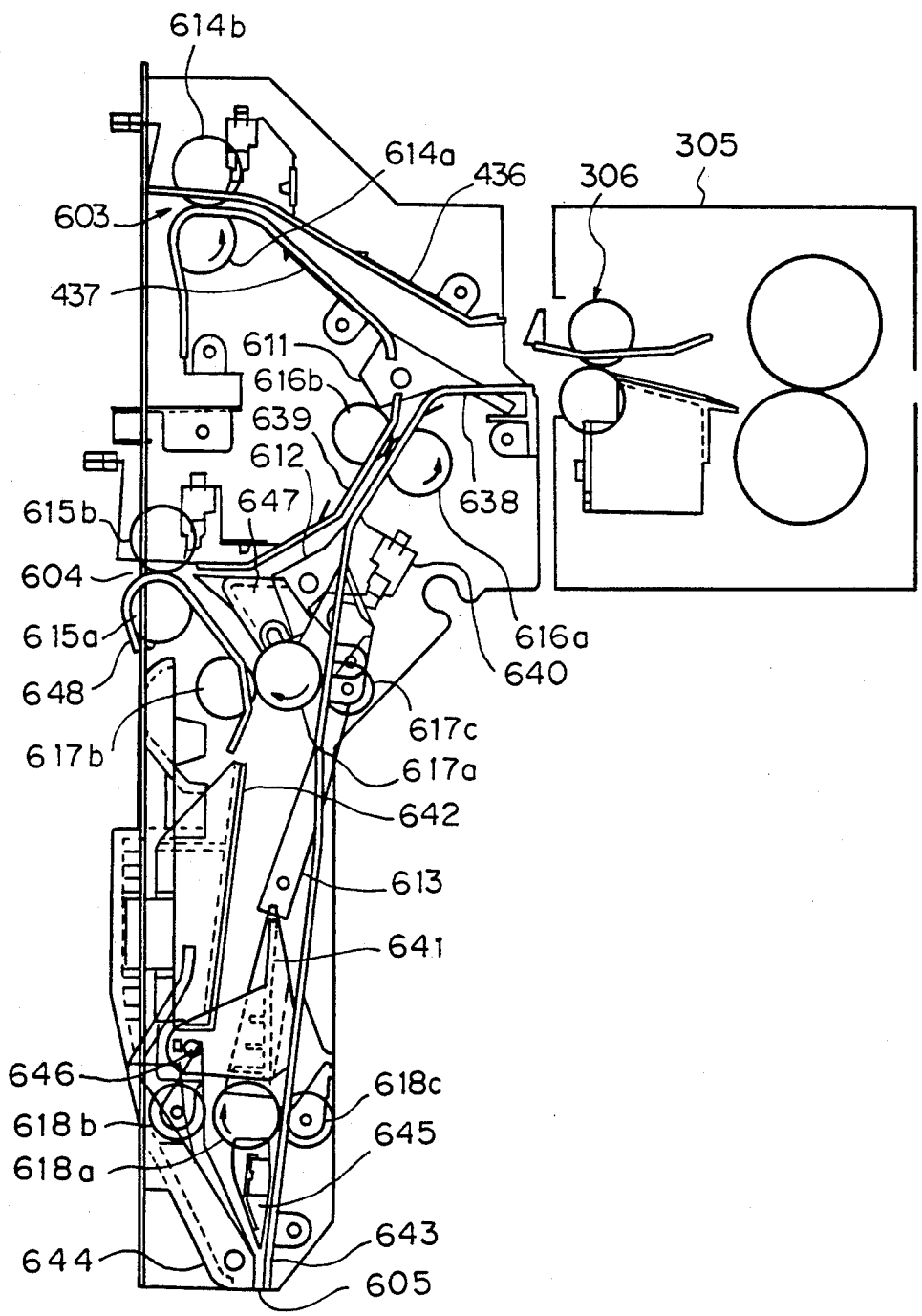
FIGS. 7 through 12 are views each showing the device of the present invention in a particular operating condition.
Figure 8:
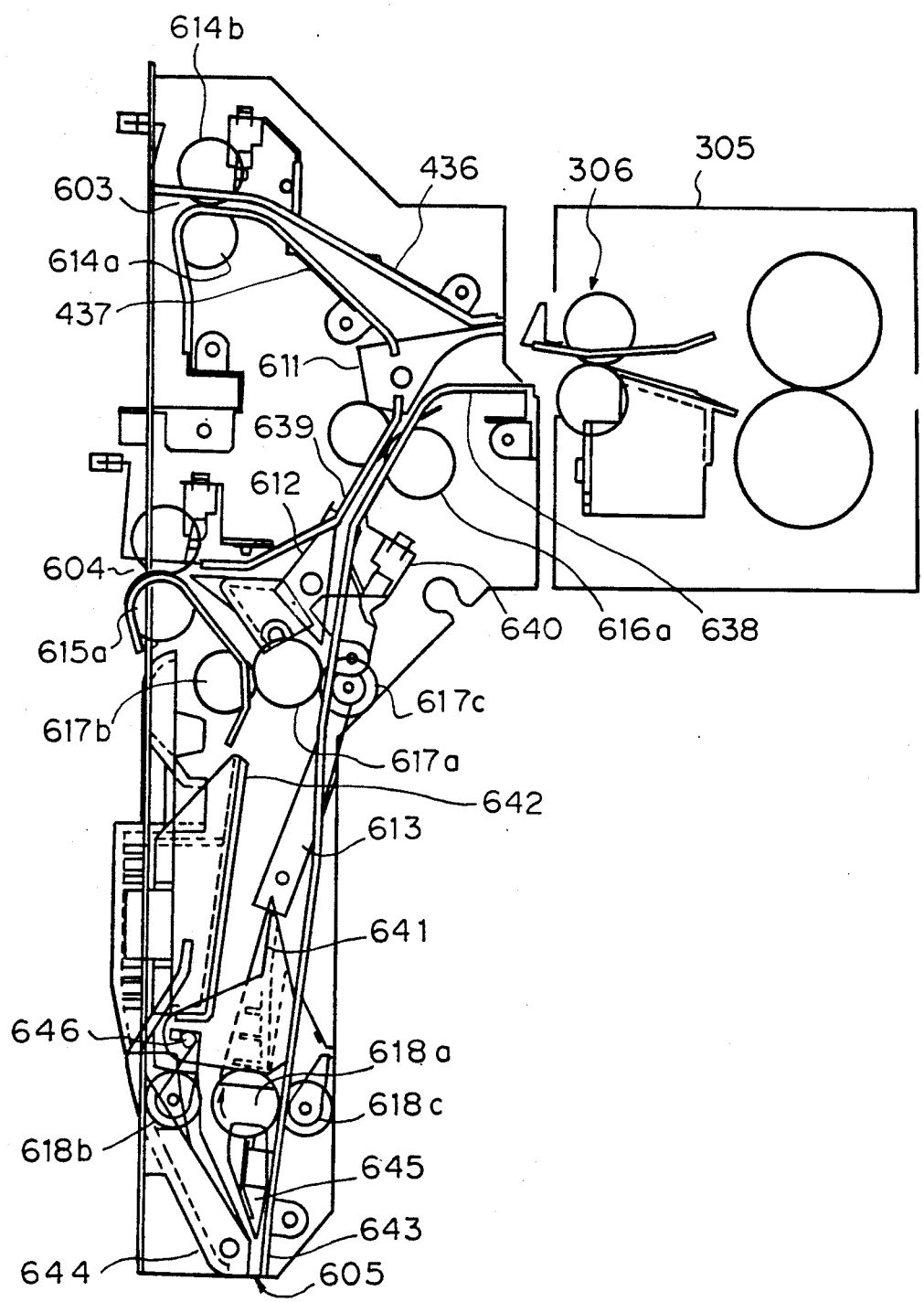

When the copier 10 shown in FIG. 3 is operated in a copier mode, solenoids S33, S34 and S35, FIG. 6, are turned off to position their associated path selectors 611, 612 and 613 in the positions shown in FIG. 7. In this condition, sheets sequentially coming out of the fixing unit 305 are guided by the path selector 611 and guides 636 and 637, and driven out by the drive roller 614a and driven roller 614b via the outlet 613. These sheets are sequentially stacked on the first tray 310.

Figure 9:
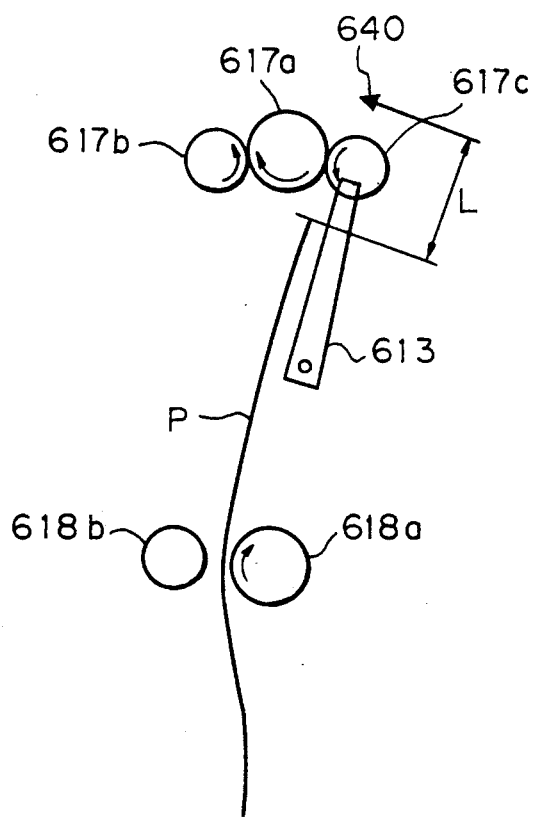
Figure 10:
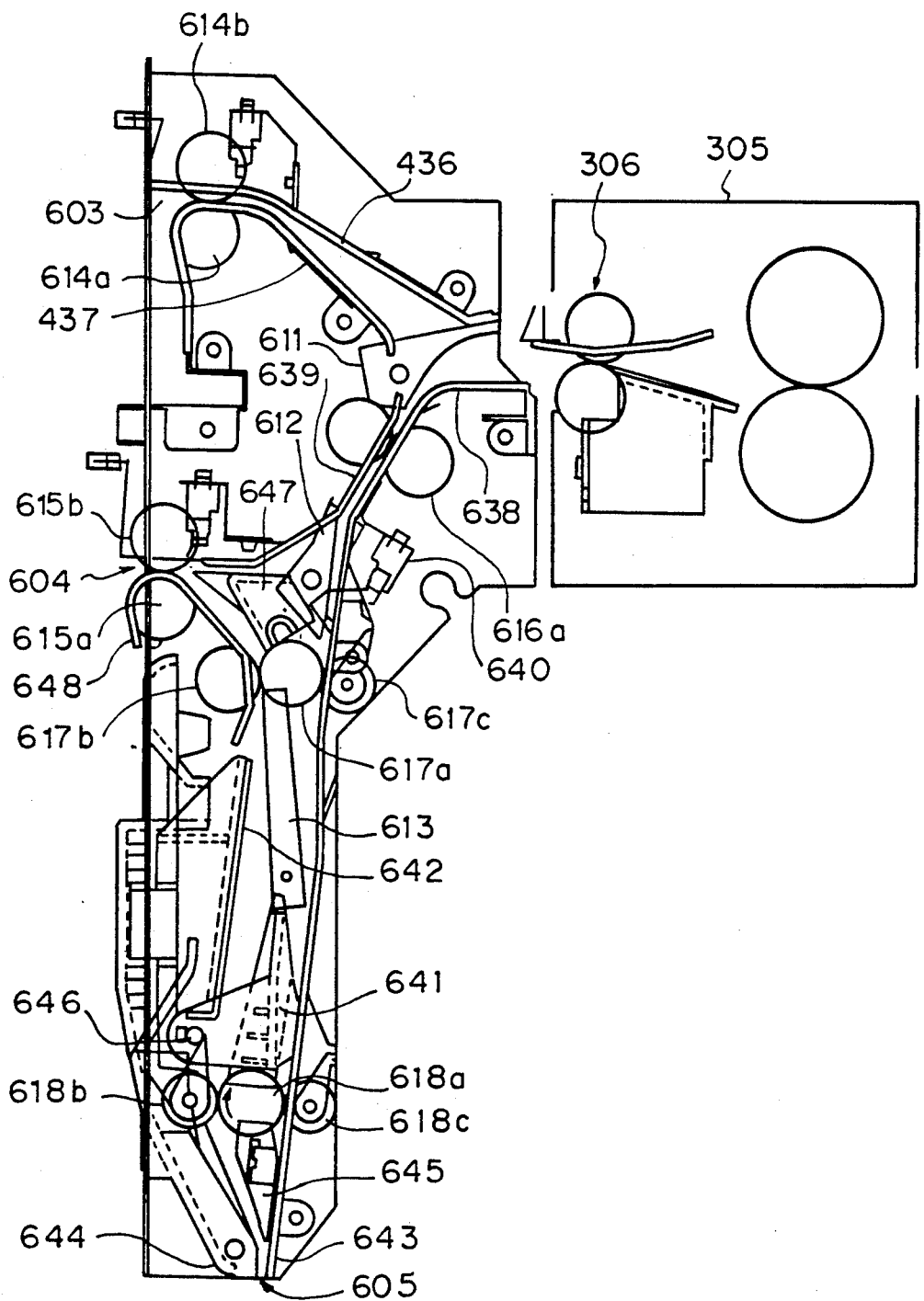
Figure 11:
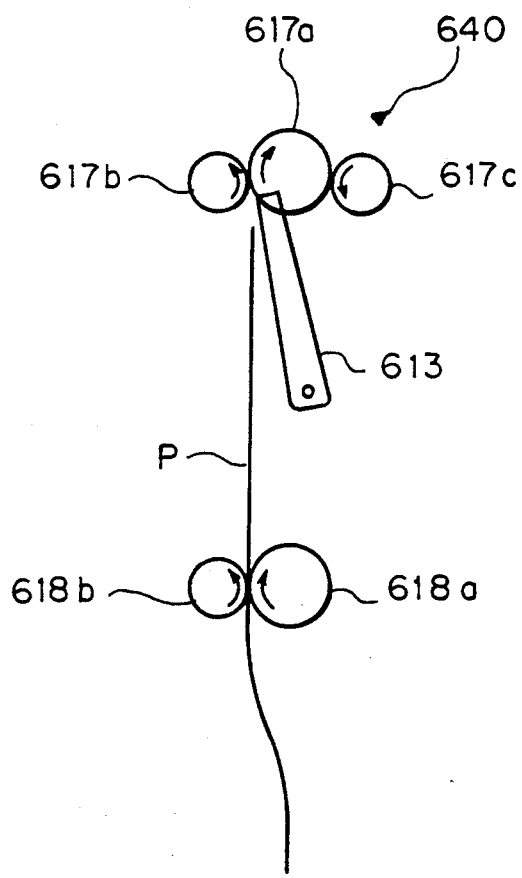

On the other hand, in a facsimile mode, sheets have to be positioned face down before discharge since they sequentially enter the device 600 face up, the first page being first. In this mode of operation, therefore, the solenoids 633 and 634 are turned on and the solenoid 635 is turned off to switch over the associated path selectors 611, 612 and 613 to the positions shown in FIG. 8. As a result, a sheet P, FIG. 9, is guided by the path selectors 611 and 612 and guides 638 and 639. The leading edge of the sheet P is nipped by the drive roller 617a and driven roller 617c after it has entered a sensor 640, FIG. 9. Thereafter, the sheet P is guided by guides 641 and 642 and, after moving away from the drive roller 618a and driven roller 618b, further guided by guides 643, 644 and 645. At this instant, the sheet P hangs down. As soon as the leading edge of the sheet P moves away from the sensor 640 and moves a distance L, FIG. 9, the solenoid 635 is energized. As a result, as shown in FIGS. 10 and 11, the tip of the path selector 613 is shifted from the nip of the drive roller 617a and 617c to the nip of the drive roller 617a and driven roller 617b. At the same time, the driven roller 618b is rotated about a shaft 646 (whose center is aligned with the center of a lever 646, FIG. 3) to nip the sheet P between it and the driven roller 618a, thereby transporting the sheet P upward. The trailing edge of the sheet P enters the nip of the driven roller 617a and driven roller 617b. Consequently, the sheet P is guided by guides 647 and 648 and driven out by the drive roller 615a and driven roller 615b via the second outlet 604. This sheet P is stacked on the second tray 312. In the case of continuous feed of multiple sheets, the path selector 613 and driven roller 618b are returned to their positions shown in FIGS. 8 and 9 when the leading edge of the next sheet blocks the sensor 640. This is followed by the above described sequence of steps.

Figure 12:
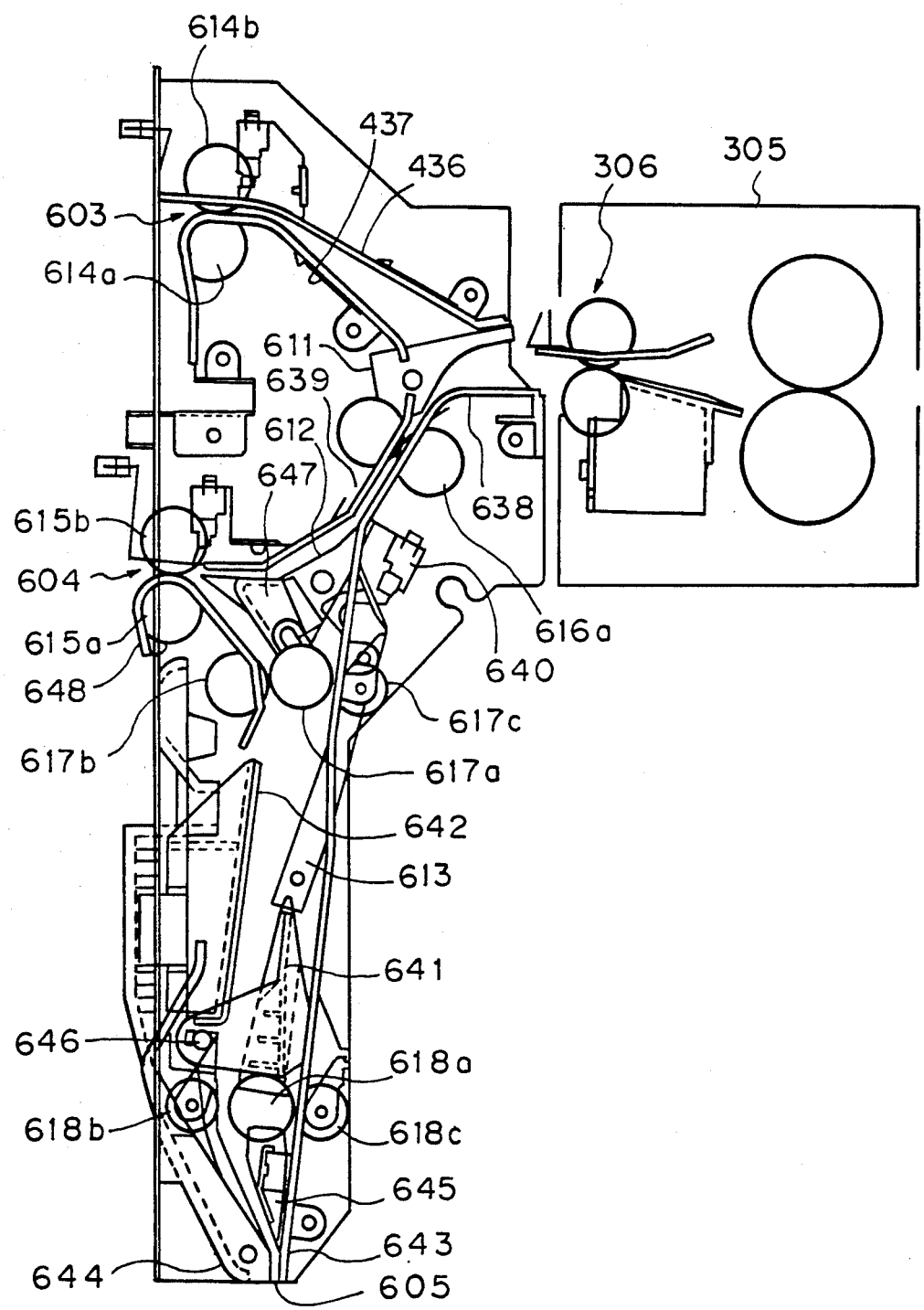

Assume that the sorter 500 is connected in the manner shown in FIG. 500. In a copier mode, the solenoid 633 is turned on and the solenoids 634 and 635 are turned off, so that the path selectors 611-613 are positioned as shown in FIG. 12. In this condition, the sheet P is guided by the path selectors 611 and 612 and guides 638, 639, 647 and 648 toward the second outlet 604 in place of the first outlet 603. The sheet P from the outlet 604 advances to the inlet 502 of the sorter 500. When sheets are discharged face down from the first page to the last page, they are discharged from the second outlet 604 and, therefore, directly transported to the inlet 502 of the sorter 500.

Further, in a two-sided copy mode, the solenoids 633-635 are turned on to position the associated path selectors 611-613 as shown in FIG. 10. As a result, the sheet P driven out from the fixing unit 305 is guided by the pawls 611-613 and guides 638, 639, 641 and 645 and driven by the drive roller 618a and driven roller 618c toward the third outlet 605. The sheet P from this outlet 605 is routed to a two-sided copy tray 402 via an inlet 401 which is formed in the two-sided copy unit 400.

In summary, in accordance with the present invention, a sheet discharging device selects one transport path and outlet in, for example, a facsimile mode and another transport path and outlet in a copier mode, the two outlets being located at different levels. This prevents sheets discharged in different modes from being mixed together. When a sorter or similar finisher is mounted on the sheet discharge side, it is possible to suitably set the levels of the outlets such that, whether the finisher is present or not, sheets are discharged at substantially the same level. The finisher blocks the outlet located upstream thereof and thereby causes it to lose the expected function. In such a case, the transfer of sheets to the outlet of interest is inhibited to eliminate a paper jam or similar trouble at the outlet side.

Further, the device of the invention discharges sheets in an optimal fashion for a particular mode. Specifically, the device selectively uses a first outlet for discharging sheets without turning them over, a second outlet for discharging sheets after turning them upside down, and a third outlet for stacking sheets on a two-sided unit face down.

Various modifications will become possible for those skilled in the art after receiving the teachings of the present disclosure without departing from the scope thereof.

What is claimed is:

1. A sheet discharging device for a digital image forming apparatus which forms an image in any one of at least two image input modes, comprising:

a sheet inlet;

at least two sheet outlets;

means for forming respectively separate sheet transport paths to said at least two sheet outlets, at least one of said at least two transport paths including means for turning over a sheet passing therethrough; and selecting means for selecting one of said at least two transport paths as a transport path for a sheet from said inlet to be transported to said outlet, as a function of a selected one of said image input modes.

2. A device as claimed in claim 1, wherein the at least two modes comprise a copier mode, a facsimile mode and a printer mode, in which said image forming equipment operates as a copier, a facsimile transceiver, and a printer, respectively.

3. A device as claimed in claim 1, wherein said outlets are each located at a particular discharge level matching a particular one of the modes.

4. A device as claimed in claim 1, wherein a finisher having an inlet communicating to any one of said outlets is operatively connected to said image forming equipment.

5. A device as claimed in claim 4, further comprising inhibiting means for inhibiting the sheet from being transported to the outlets other than said outlet to which said inlet of said finisher communicates.

6. A device as claimed in claim 1, further comprising reversing means for turning over, in particular one of the modes, the sheet being transported toward particular one of said outlets.

7. The sheet discharging device of claim 1 wherein the selecting means selects the at least one of the transport paths including means for turning over a sheet in a facsimile image input mode.

* * * * *